Figure 1:
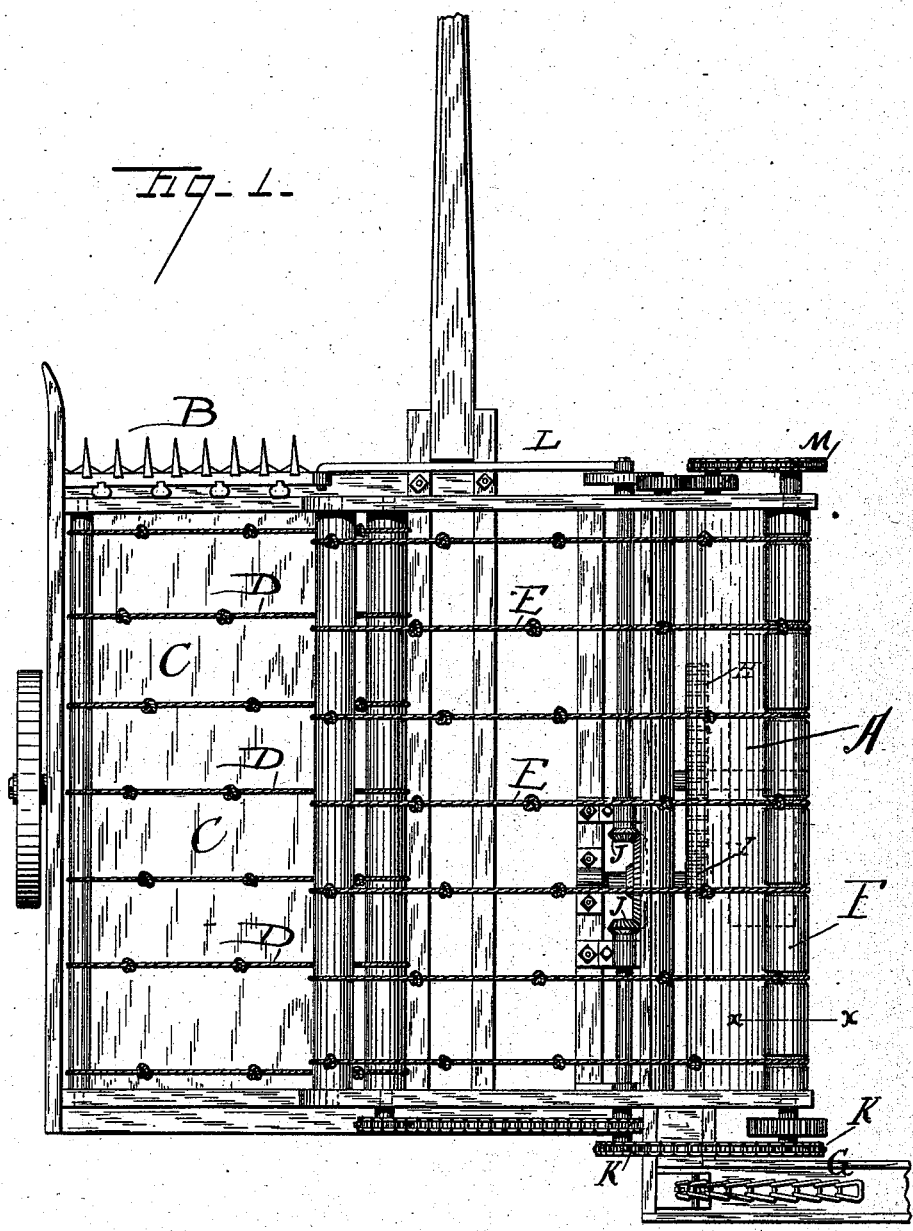

(No Model.) 2 Sheets—Sheet 1.

J. A. NORTON & J. A. STONES.
CORN HARVESTER.

No. 381,163. Patented Apr. 17, 1888.

Witnesses
A. S. Paré
George C. Cook

Inventor
James A. Norton,
John A. Stones
By Banning & Banning
Attorneys (No Model.) 2 Sheets—Sheet 2.
J. A. NORTON & J. A. STONES.
CORN HARVESTER.
No. 381,163. Patented Apr. 17, 1888.
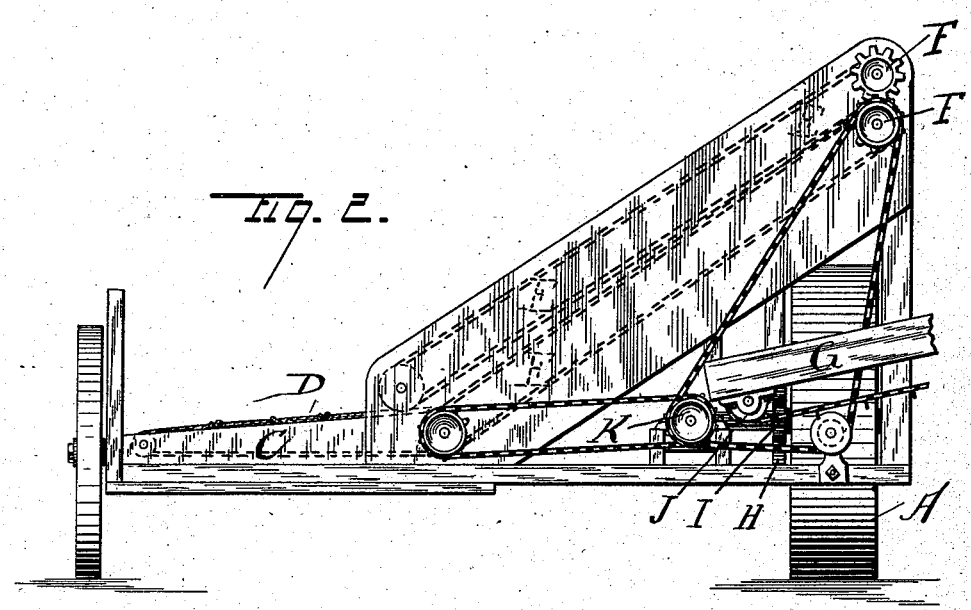
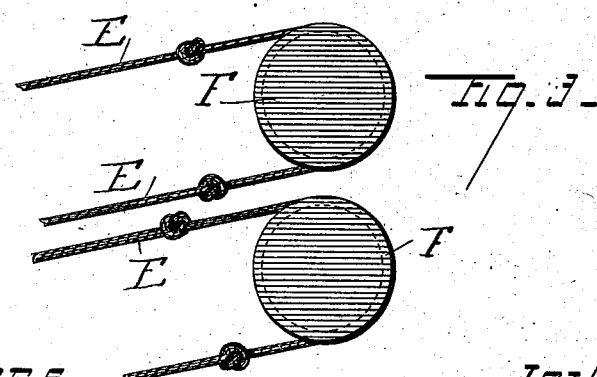
WITNESSES
A. S. Paré
George C. Cook
INVENTOR
James A. Norton,
John A. Stones,
By Banning & Banning.
Attorneys

United States Patent Office.

JAMES A. NORTON, OF ODEBOLT, IOWA, AND JOHN A. STONES, OF CHICAGO, ILLINOIS.

CORN-HARVESTER.

SPECIFICATION forming part of Letters Patent No. 381,163, dated April 17, 1888.

Application filed July 12, 1886. Serial No. 207,746. (No model.)

*To all whom it may concern:*

Be it known that we, JAMES A. NORTON, a citizen of the United States, residing at Odebolt, in the county of Sac and State of Iowa, and JOHN A. STONES, a citizen of the United States, residing at Chicago, Illinois, have invented certain new and useful Improvements in Corn-Harvesters, of which the following is a specification.

In the drawings, Figure 1 is a plan view of our improved and combined corn-reaper and ear and stalk separator. Fig. 2 is a rear elevation of the same, and Fig. 3 is a transverse sectional view of the separating-rollers.

In the drawings, A is the main driving-wheel of our machine; B, the sickle-bar; C, the platform on which the stalks fall as they are cut.

D are the ropes by which the stalks are carried toward the elevator-rollers. E are the ropes by which they are carried forward and upward toward the separating-rollers.

F are the picking or separating rollers.

G is a trough or way along which the husked ears are conveyed to the wagon.

H is a gear-wheel on the side of the main or driving wheel. I is a spur-wheel meshing into such gear-wheel.

J are beveled gear-wheels.

K are sprocket-wheels at the rear end of the machine.

L is the pitman-rod for driving the sickle.

M is a sprocket-wheel on the forward end of the upper separating-roller.

In constructing our combined corn-harvester and ear and stalk separator we make a corn-harvester with a platform mounted on wheels and carrying a sickle-bar at its forward end to cut the cornstalks and permit them to fall back upon the platform. We make the frame, however, much wider than it is usually made, and much wider than the platform. One side of this frame is supported by any ordinary wheel and the other by the main driving-wheel. At the side of the platform toward the driving-wheel we place two rollers, which we term "feed-rollers," located in proper supports one above the other, while at the side of the platform toward the ordinary supporting-wheel we place another roller. Elevated at some distance above the driving-wheel are located two other rollers, F, which we term the "picking" or "separating" rollers, as their office is to separate the ears of corn from the stalks. The roller at the side of the platform next to the ordinary supporting-wheel and the lower of the two feed-rollers are connected together by ropes D around them at suitable intervals apart and provided with knots, so that as the rollers revolve and the ropes or chains are carried along the stalks of corn falling across them will be advanced toward the separator. Both the lower and upper feed-rollers and the separating-rollers are connected together by ropes around them at suitable distances apart and provided with knots, so that as these rollers are operated and the ropes carried along the stalks of corn will be advanced between the feed-rollers and forward and upward between the two sets of ropes to the separating-rollers, where they are presented with their sides to the separating rollers. When they reach these separating-rollers, the stalks are carried sidewise between them and the ears crowded or pinched off, as the rollers are placed so close together that the ears cannot pass between them with the stalks.

The advantage of using cords or ropes between the feed and separating rollers instead of a broad belt or broad conveyer is that the ears of corn will always hang down between them, so that they cannot be caught or pulled between the separating-rollers. As the ears are thus separated from the stalks, they fall down through the ropes or cords into the hopper or entrance to the husker.

It will be seen that by using separate ropes or conveyers to carry the stalks of corn to the separating-rollers and advancing such stalks laterally the ears will fall through the spaces between the ropes and hang pendent while on the passage, so that when they are delivered to the rollers through which the stalks are forced—which may be termed the "picking mechanism"—the stalk will first enter the rollers, and the stem of the ear will be presented to such rollers first. In this way we avoid the difficulty which is often encountered in harvesters of ears of corn presenting themselves first to the rollers; and hence instead of being picked, ear and all are carried through and the corn ground up. Our manner of presenting the ears is secured by employing a series of separate ropes or conveyers for lifting or conveying the stalks. As our object in using a series of ropes is to secure space for the ears to hang between, they may, instead of being a series of ropes, technically, be any kind of separate conveyers which shall allow the ears to be pendent while being conveyed.

We are aware that stalks have been cut and conveyed to husking-rollers endwise, rearwardly, and that a space in front of the rollers has been provided, whereby the ears might fall and become pendent; but in machines of this class the stalks fall one upon the other in such a way that the lower stalks support the upper ears and prevent their hanging; but in our machine we move the cut corn laterally, so that the conveying mechanism tends to separate out the stalks and produce space between them. By moving the stalks laterally and having the rollers parallel with the line of advance of the machine the stalks are carried sidewise through the rollers, as above explained, and hence pass through one at a time, which we find in practice to materially reduce the draft of the machine.

This husker is located on the frame and in proper position to receive the ears as they are crowded off the stalks and fall through the elevating-ropes. The construction and operation of this husker may be that shown and described in either of the Letters Patent heretofore granted to James A. Norton by the United States, No. 307,136, of October 28, 1884, and No. 308,691, of December 2, 1884, and need not be further described.

The action of the different parts of the machine when in operation will be apparent from the above description without further detail.

What we claim is—

1. In a corn-harvester, cutting apparatus, and conveying mechanism moving transversely to the line of draft of the machine, the conveying mechanism having spaces into which the ears of corn may depend as the stalks are carried sidewise onward to the picking-rollers, and picking-rollers, to which the stalks are delivered, located transversely to the line of movement of the delivering mechanism and adapted to seize the stalks while the ears are still hanging and pinch or snap them off, substantially as described.

2. In a corn-harvesting machine, the combination of a series of knotted cords lying parallel to the sickle to carry the severed stalks to the elevating device, two series of moving knotted elevating-ropes, one above the other, lying at an angle and transverse to the tongue or line of draft of the machine to receive the severed stalks between the two series from the conveyers and elevate them and deliver them sidewise directly to the separating-rollers, and separating-rollers situated at the top of the elevating-ropes to detach the ears from the stalks, substantially as described.

JAMES A. NORTON.
JOHN A. STONES.

Witnesses to Norton's signature:
  FRANK J. LONG,
  G. M. TAGGART.

Witnesses to Stones's signature:
  JOHN B. KASPARI,
  M. E. HOLTON.